United States Patent
Bae

(10) Patent No.: US 11,544,862 B2
(45) Date of Patent: Jan. 3, 2023

(54) IMAGE SENSING DEVICE AND OPERATING METHOD THEREOF

(71) Applicant: SK hynix Inc., Gyeonggi-do (KR)

(72) Inventor: Jong Hyun Bae, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 202 days.

(21) Appl. No.: 16/997,498

(22) Filed: Aug. 19, 2020

(65) Prior Publication Data

US 2021/0279899 A1 Sep. 9, 2021

(30) Foreign Application Priority Data

Mar. 4, 2020 (KR) .................. 10-2020-0027109

(51) Int. Cl.
| | |
|---|---|
| *G06T 7/40* | (2017.01) |
| *H04N 5/232* | (2006.01) |
| *G06T 7/00* | (2017.01) |
| *H04N 5/345* | (2011.01) |

(52) U.S. Cl.
CPC .................. *G06T 7/40* (2013.01); *G06T 7/00* (2013.01); *H04N 5/23235* (2013.01); *H04N 5/23245* (2013.01); *H04N 5/3454* (2013.01); *G06T 2207/10024* (2013.01)

(58) Field of Classification Search
CPC .... G06T 7/00; G06T 7/40; G06T 7/13; G06T 5/20; G06T 2207/10024; G06T 2207/20192; G06T 2207/20012; H04N 5/23235; H04N 5/23245; H04N 5/3454
See application file for complete search history.

(56) References Cited

U.S. PATENT DOCUMENTS

| | | | |
|---|---|---|---|
| 9,489,720 B2* | 11/2016 | Oron | G06T 5/20 |
| 11,069,041 B2* | 7/2021 | Lakemond | G06T 5/20 |
| 11,282,173 B2* | 3/2022 | Yahata | G06K 9/6215 |
| 2011/0234865 A1* | 9/2011 | Ogasahara | H04N 9/04515 |
| | | | 257/E27.13 |
| 2012/0188373 A1* | 7/2012 | Kwon | G06T 7/11 |
| | | | 348/148 |
| 2018/0150936 A1* | 5/2018 | Wei | G06T 5/002 |
| 2018/0150937 A1* | 5/2018 | Tang | H04N 9/04557 |
| 2018/0150938 A1* | 5/2018 | Wei | G06T 3/4007 |
| 2018/0152634 A1* | 5/2018 | Tang | H04N 7/0142 |

(Continued)

FOREIGN PATENT DOCUMENTS

| | | | |
|---|---|---|---|
| CN | 112529773 A | * | 3/2021 |
| CN | 113989309 A | * | 1/2022 |
| KR | 10-0818447 | | 4/2008 |

*Primary Examiner* — John Villecco
(74) *Attorney, Agent, or Firm* — IP & T Group LLP

(57) ABSTRACT

An image sensing device includes an analysis module suitable for analyzing, based on pixel values of a kernel, an image texture of the kernel including a target pixel group and one or more adjacent pixel groups, a sum module suitable for generating any one of a first target sum value and a second target sum value based on an analysis result of the analysis module, wherein first target sum value is obtained by applying texture characteristics of the kernel in target pixel values of the target pixel group and the second target sum value is obtained without applying the texture characteristics of the kernel in the target pixel values, and a processing module suitable for generating a sum image based on any one of the first and second target sum values.

18 Claims, 7 Drawing Sheets

(56) References Cited

U.S. PATENT DOCUMENTS

| | | | | |
|---|---|---|---|---|
| 2018/0152646 A1* | 5/2018 | Tang | ................ | H04N 5/35572 |
| 2018/0152683 A1* | 5/2018 | Wei | ..................... | G06T 3/4015 |
| 2021/0399036 A1* | 12/2021 | Lee | ..................... | H04N 5/359 |
| 2021/0400221 A1* | 12/2021 | Lee | ................... | H04N 9/04557 |
| 2022/0108424 A1* | 4/2022 | Gan | ................... | G06T 3/4046 |

* cited by examiner

IMAGE SENSING DEVICE AND OPERATING METHOD THEREOF

CROSS-REFERENCE TO RELATED APPLICATION(S)

This application claims priority under 35 U.S.C. § 119 to Korean Patent Application No. 10-2020-0027109, filed on Mar. 4, 2020, the disclosure of which is incorporated herein by reference in its entirety.

BACKGROUND

1. Field

Various embodiments of the present disclosure relate to a semiconductor design technique, and more particularly, to an image sensing device and an operating method thereof.

2. Description of the Related Art

Image sensing devices are devices for capturing images using the property of a semiconductor which reacts to light. Image sensing devices may be roughly classified into charge-coupled device (CCD) image sensing devices and complementary metal-oxide semiconductor (CMOS) image sensing devices. Recently, CMOS image sensing devices are widely used because the CMOS image sensing devices can allow both analog and digital control circuits to be directly implemented on a single integrated circuit (IC).

SUMMARY

Various embodiments of the present disclosure are directed to an image sensing device capable of preventing loss of resolution performance that is, resolving power in a low light mode or a preview mode, and an operating method of the image sensing device.

In accordance with an embodiment, an image sensing device may include an analysis module suitable for analyzing, based on pixel values of a kernel, an image texture of the kernel including a target pixel group and one or more adjacent pixel groups; a sum module suitable for generating any one of a first target sum value and a second target sum value based on an analysis result of the analysis module, wherein first target sum value is obtained by applying texture characteristics of the kernel in target pixel values of the target pixel group and the second target sum value is obtained without applying the texture characteristics of the kernel in the target pixel values; and a processing module suitable for generating a sum image based on any one of the first and second target sum values.

The image texture may include information indicating whether the kernel is an edge region or a flat region.

In accordance with an embodiment, an image sensing device may include an image sensor including a pixel array having a quad pattern, and suitable for sensing pixel values generated from the pixel array; and an image processor suitable for calculating first to fourth weights corresponding to texture characteristics for each kernel based on the pixel values for each kernel, and generating a first target sum value for each kernel by applying the first to fourth weights respectively in first to fourth target pixel values for each kernel.

The image processor may analyze an image texture for each kernel, and generates the first target sum value for each kernel based on an analysis result, or generates a second target sum value for each kernel without applying the first to fourth weights in the first to fourth target pixel values.

The image texture may include information indicating whether the kernel is an edge region or a flat region.

In accordance with an embodiment, an operating method of an image sensing device may include entering a set mode; analyzing, based on pixel values of a kernel, an image texture of the kernel including a target pixel group, a reference pixel group and first to third peripheral pixel groups; calculating, when an analysis result of the image texture indicates that the kernel is an edge region, first to fourth weights based on target pixel values of the target pixel group, reference pixel values of the reference pixel group, first peripheral pixel values of the first peripheral pixel group, second peripheral pixel values of the second peripheral pixel group and third peripheral pixel values of the third peripheral pixel group; and generating a first target sum value of the target pixel group based on the first to fourth weights and the target pixel values.

The set mode may include a low light level mode or a preview mode.

The operating method may further include generating a second target sum value of the target pixel group based on the target pixel values when the analysis result of the image texture indicates that the kernel is a flat region; and generating a sum image based on any one of the first target sum value and the second target sum value.

In accordance with an embodiment, an operating method of an image sensing device may include sensing pixel values generated from a pixel region having a quad pattern; generating, when the pixel region has an edge pattern in a low light level mode or a preview mode, a sum value by applying first to fourth weights to target pixel values among the pixel values, the first to fourth weights being obtained on a basis of the pixel values; and generating a sum image based on the sum value.

The sum value may be obtained without applying the first to fourth weights to target pixel values among the pixel values when the pixel region has a flat pattern in the low light level mode or the preview mode.

BRIEF DESCRIPTION OF THE DRAWINGS

The above and other features and advantages of the present disclosure will become more apparent to those skilled in the art to which the present disclosure pertains by the following detailed description with reference to the attached drawings.

DETAILED DESCRIPTION

Various embodiments are described below with reference to the accompanying drawings, in order to describe in detail the present disclosure so that those with ordinary skill in art to which the present disclosure pertains may easily carry out the technical spirit of the present disclosure. These embodiments are provided so that this disclosure is thorough and complete, and fully conveys the scope of the present disclosure to those skilled in the art.

It will be understood that when an element is referred to as being "connected to" or "coupled to" another element, it may be directly on, connected to or coupled to the other element, or one or more intervening elements may be present. In addition, it will also be understood that the terms "comprises," "comprising," "includes," and "including" when used in this specification, specify the presence of the stated elements and do not preclude the presence or addition of one or more other elements. In the description of the entire specification, some components are described in singular forms, but the present disclosure is not limited thereto, and it will be understood that the components may be formed in plural.

Figure 1:
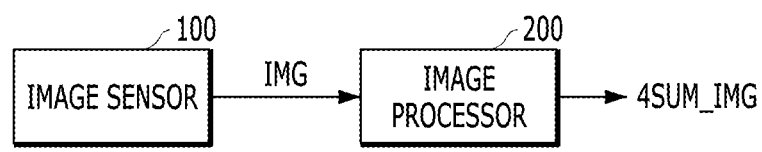
FIG. 1 is a block diagram illustrating an image sensing device in accordance with an embodiment of the present disclosure.

FIG. 1 is a block diagram illustrating an image sensing device in accordance with an embodiment of the present disclosure.

Referring to FIG. 1, the image sensing device may include an image sensor 100 and an image processor 200.

The image sensor 100 may generate an image IMG based on incident light. The image IMG may include pixel values generated from a pixel array, which is to be described below.

The image processor 200 may generate a sum image 4SUM_IMG based on the image IMG in a set mode. The set mode may include a low light level mode or a preview mode. In an embodiment, when entering the set mode, the image sensing device may also enter a 4-sum mode in which pixel values of 2×2 pixels in the same color are summed.

The image processor 200 may generate the sum image 4SUM_IMG by analyzing an image texture for each kernel UK of the pixel array based on the pixel values and generating a first target sum value G4' and a second target sum value G4 for each kernel UK based on the analysis result. For each kernel UK, the image processor 200 may calculate first to fourth weights W1, W2, W3 and W4 corresponding to texture characteristics for each kernel UK based on the pixel values, generate the first target sum value G4' by applying the first to fourth weights W1, W2, W3 and W4 in first to fourth target pixel values g41, g42, g43 and g44, respectively, and generate the second target sum value G4 without applying the first to fourth weights W1, W2, W3 and W4 in the first to fourth target pixel values g41, g42, g43 and g44.

The image texture may include information indicating whether the kernel UK is an edge region or a flat region. The edge region may refer to a high frequency region that includes detailed image information. The flat region may refer to a low frequency region that does not include the detailed image information.

Figure 2:
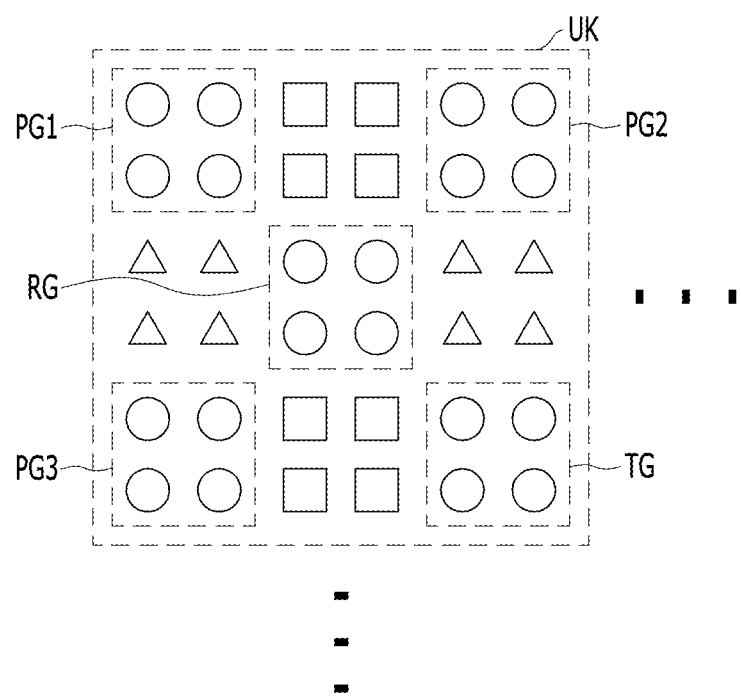
FIG. 2 is a detailed diagram of a pixel array included in an image sensor illustrated in FIG. 1.

FIG. 2 is a detailed diagram of the pixel array included in the image sensor 100 illustrated in FIG. 1.

Referring to FIG. 2, the pixel array may include a plurality of pixels arranged in a quad pattern. The quad pattern refers to a pattern in which the pixels in the same color are arranged in 2×2 units. The pixel array may include a plurality of pixel groups for each kernel UK. For each kernel UK, the pixel array may include a target pixel group TG and adjacent pixel groups RG, PG1, PG2 and PG3 having the same color as the target pixel group TG. Hereinafter, one pixel group of the adjacent pixel groups RG, PG1, PG2 and PG3 is referred to as a "reference pixel group RG", and the other pixel groups thereof are referred to as "first to third peripheral pixel groups PG1, PG2 and PG3".

The reference pixel group RG may be disposed in the center of the kernel UK, and the first to third peripheral pixel groups PG1, PG2 and PG3 and the target pixel group TG may be disposed around the reference pixel group RG. Each of the target pixel group TG, the reference pixel group RG and the first to third peripheral pixel groups PG1, PG2 and PG3 may include first to fourth pixels. The first to fourth pixels may have the same color. For example, the same color may include a green color.

The reference pixel group RG may generate first to fourth reference pixel values g01, g02, g03 and g04, the first peripheral pixel group PG1 may generate first to fourth peripheral pixel values g11, g12, g13 and g14, the second peripheral pixel group PG2 may generate first to fourth peripheral pixel values g21, g22, g23 and g24, the third peripheral pixel group PG3 may generate first to fourth peripheral pixel values g31, g32, g33 and g34, and the target pixel group TG may generate the first to fourth target pixel values g41, g42, g43 and g44.

Hereinafter, a single kernel UK is representatively described for convenience in description.

Figure 3:
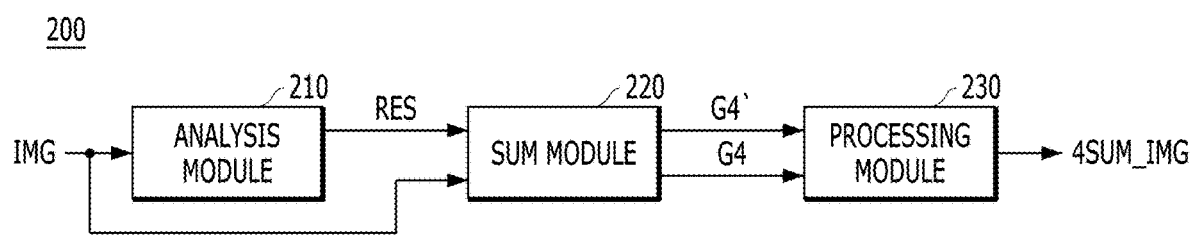
FIG. 3 is a detailed diagram of an image processor illustrated in FIG. 1.

FIG. 3 is a detailed diagram of the image processor 200 illustrated in FIG. 1.

Referring to FIG. 3, the image processor 200 may include an analysis module 210, a sum module 220 and a processing module 230. The analysis module 210, the sum module 220 and the processing module 230 include all circuits, systems, software, firmware and devices necessary for their respective operations and functions.

The analysis module 210 may analyze the image texture of the kernel UK based on the pixel values included in the image IMG. For example, the analysis module 210 may analyze whether the kernel UK is the edge region or the flat region, based on the pixel values.

The sum module 220 may generate any one of the first target sum value G4' and the second target sum value G4 based on an analysis result RES of the analysis module 210 and the image IMG. The first target sum value G4' is obtained by applying (or reflecting) the texture characteristics of the kernel UK in the first to fourth target pixel values g41, g42, g43 and g44 of the target pixel group TG, and the second target sum value G4 is obtained without applying (or reflecting) the texture characteristics of the kernel UK in the first to fourth target pixel values g41, g42, g43 and g44. Particularly, the sum module 220 may calculate the first to fourth weights W1, W2, W3 and W4 of the reference pixel group RG based on the pixel values of the kernel UK, and the first to fourth weights W1, W2, W3 and W4 may be regarded as the texture characteristics of the kernel UK.

The processing module 230 may generate the sum image 4SUM_IMG based on any one of the first and second target sum values G4' and G4. Although the sum image 4SUM_IMG is downsized according to the 4-sum mode as compared to the image IMG, the resolution performance of the sum image 4SUM_IMG may be improved by applying the texture characteristics.

Figure 4:
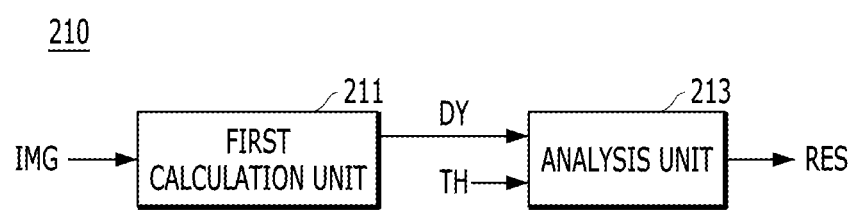
FIG. 4 is a detailed diagram of an analysis module illustrated in FIG. 3.

FIG. 4 is a detailed diagram of the analysis module 210 illustrated in FIG. 3.

Referring to FIG. 4, the analysis module 210 may include a first calculation unit 211 and an analysis unit 213. The first calculation unit 211 and the analysis unit 213 include all circuits, systems, software, firmware and devices necessary for their respective operations and functions.

The first calculation unit 211 may generate a characteristic value DY of the kernel UK indicating a dynamic range of the kernel UK, based on the pixel values of the kernel UK included in the image IMG. The characteristic value DY of the kernel UK may be calculated based on the following Equation 1.

$$DY = MAX\{UK\} - MIN\{UK\} \quad \text{[Equation 1]}$$

Herein, "MAX{UK}" may refer to a maximum value among the sum values of the pixel groups included in the kernel UK. "MIN{UK}" may refer to a minimum value among the sum values of the pixel groups included in the kernel UK.

That is, the first calculation unit 211 may subtract the minimum value MIN{UK} from the maximum value MAX{UK}, among the sum values of the kernel UK, thereby calculating the characteristic value DY of the kernel UK.

The analysis unit 213 may analyze the image texture of the kernel UK based on the characteristic value DY of the kernel UK and a reference value TH. For example, the analysis unit 213 may compare the characteristic value DY of the kernel UK with the reference value TH, and analyze whether the image texture of the kernel UK is the edge region or the flat region, according to the comparison result.

Figure 5:
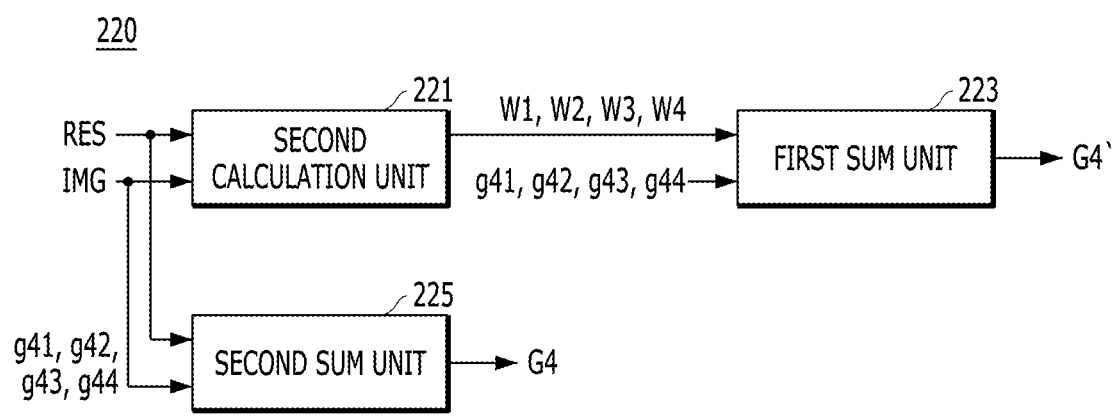
FIG. 5 is a detailed diagram of a sum module illustrated in FIG. 3.

FIG. 5 is a detailed diagram of the sum module 220 illustrated in FIG. 3.

Referring to FIG. 5, the sum module 220 may include a second calculation unit 221, a first sum unit 223 and a second sum unit 225. The second calculation unit 221, the first sum unit 223, and the second sum unit 225 include all circuits, systems, software, firmware and devices necessary for their respective operations and functions.

The second calculation unit 221 may generate the first to fourth weights W1, W2, W3 and W4 based on the analysis result RES of the analysis module 210 and the image IMG. For example, when the image texture of the kernel UK is the edge region, the second calculation unit 221 may calculate the first to fourth weights W1, W2, W3 and W4 corresponding to the texture characteristics of the kernel UK based on the first to fourth reference pixel values g01, g02, g03 and g04, the first to fourth peripheral pixel values g11, g12, g13 and g14, the first to fourth peripheral pixel values g21, g22, g23 and g24, the first to fourth peripheral pixel values g31, g32, g33 and g34 and the first to fourth target pixel values g41, g42, g43 and g44. The first to fourth weights W1, W2, W3 and W4 may be calculated based on the following Equations 2 to 5.

$$W1 = G1/G0 \quad \text{[Equation 2]}$$

Herein, "G0" may refer to a value obtained by summing up the first to fourth reference pixel values g01, g02, g03 and g04, that is, a 4-sum value of the reference pixel group RG. "G1" may refer to a value obtained by summing up the first to fourth peripheral pixel values g11, g12, g13 and g14, that is, a 4-sum value of the first peripheral pixel group PG1.

The first weight W1 may correspond to a value obtained by dividing the value G1, obtained by summing up the first to fourth peripheral pixel values g11, g12, g13 and g14, by the value G0 obtained by summing up the first to fourth reference pixel values g01, g02, g03 and g04. In other words, the first weight W1 may refer to a ratio of the value G1 obtained by summing up the first to fourth peripheral pixel values g11, g12, g13 and g14 and the value G0 obtained by summing up the first to fourth reference pixel values g01, g02, g03 and g04.

$$W2 = G2/G0 \quad \text{[Equation 3]}$$

Herein, "G2" may refer to a value obtained by summing up the first to fourth peripheral pixel values g21, g22, g23 and g24, that is, a 4-sum value of the second peripheral pixel group PG2.

The second weight W2 may correspond to a value obtained by dividing the value G2, obtained by summing up the first to fourth peripheral pixel values g21, g22, g23 and g24, by the value G0 obtained by summing up the first to fourth reference pixel values g01, g02, g03 and g04. In other words, the second weight W2 may refer to a ratio of the value G2 obtained by summing up the first to fourth peripheral pixel values g21, g22, g23 and g24 and the value G0 obtained by summing up the first to fourth reference pixel values g01, g02, g03 and g04.

$$W3 = G3/G0 \quad \text{[Equation 4]}$$

Herein, "G3" may refer to a value obtained by summing up the first to fourth peripheral pixel values g31, g32, g33 and g34, that is, a 4-sum value of the third peripheral pixel group PG3.

The third weight W3 may correspond to a value obtained by dividing the value G3, obtained by summing up the first to fourth peripheral pixel values g31, g32, g33 and g34, by the value G0 obtained by summing up the first to fourth reference pixel values g01, g02, g03 and g04. In other words, the third weight W3 may refer to a ratio of the value G3 obtained by summing up the first to fourth peripheral pixel values g31, g32, g33 and g34 and the value G0 obtained by summing up the first to fourth reference pixel values g01, g02, g03 and g04.

$$W4 = G4/G0 \quad \text{[Equation 5]}$$

Herein, "G4" may refer to a value obtained by summing up the first to fourth target pixel values g41, g42, g43 and g44, that is, a 4-sum value of the target pixel group TG, as described above.

The fourth weight W4 may correspond to a value obtained by dividing the value G4, obtained by summing up the first to fourth target pixel values g41, g42, g43 and g44, by the value G0 obtained by summing up the first to fourth reference pixel values g01, g02, g03 and g04. In other words, the fourth weight W4 may refer to a ratio of the value G4 obtained by summing up the first to fourth target pixel values g41, g42, g43 and g44 and the value G0 obtained by summing up the first to fourth reference pixel values g01, g02, g03 and g04.

The first sum unit 223 may generate the first target sum value G4' based on the first to fourth weights W1, W2, W3 and W4 and the first to fourth target pixel values g41, g42, g43 and g44. For example, the first target sum value G4' may be calculated based on the following Equation 6.

$$G4' = Wi*g4i = (W1*g41) + (W2*g42) + (W3*g43) + (W4*g44) \quad \text{[Equation 6]}$$

That is, the first target sum value G4' may be calculated by summing up a value (W1*g41) obtained by multiplying the first target pixel value g41 by the first weight W1, a value (W2*g42) obtained by multiplying the second target pixel value g42 by the second weight W2, a value (W3*g43) obtained by multiplying the third target pixel value g43 by the third weight W3 and a value (W4*g44) obtained by multiplying the fourth target pixel value g44 by the fourth weight W4.

The second sum unit 225 may generate the second target sum value G4 based on the analysis result RES of the analysis module 210 and the first to fourth target pixel values g41, g42, g43 and g44. For example, when the image texture of the kernel UK is the flat region, the second sum unit 225 may perform sum-up processing on the first to fourth target pixel values g41, g42, g43 and g44, thereby calculating the second target sum value G4.

Hereinafter, an operation of the image sensing device having the above-described configuration in accordance with the present embodiment is described.

Figure 6:
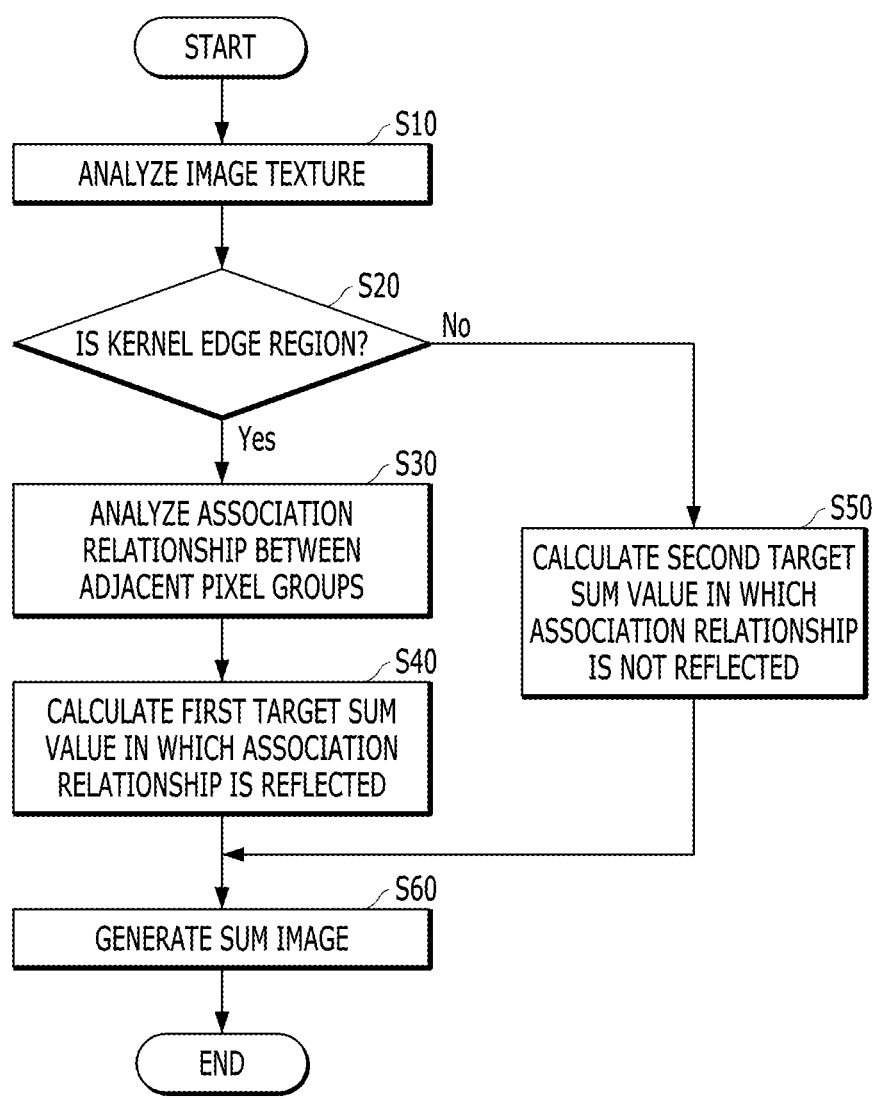
FIG. 6 is a flowchart illustrating an operation of an image sensing device in accordance with an embodiment of the present disclosure.

FIG. 6 is a flowchart illustrating the operation of the image sensing device illustrated in FIG. 1.

Referring to FIG. 6, the image sensing device may enter a set mode. For example, the set mode may include a low light level mode or a preview mode. When entering the set mode, the image sensing device may also enter a 4-sum mode in which pixel values of 2×2 pixels in the same color are summed.

The image sensor 100 may generate an image IMG based on incident light. The image IMG may include pixel values of pixels included in a kernel UK. The kernel UK may include a target pixel group TG, a reference pixel group RG and first to third peripheral pixel groups PG1, PG2 and PG3.

The image processor 200 may analyze an image texture of the kernel UK based on the image IMG, in step S10. For example, the image processor 200 may analyze whether the kernel UK is an edge region or a flat region, in step S20.

When the analysis result of the image texture indicates that the kernel UK is the edge region (that is, "YES" in step S20), the image processor 200 may analyze an association relationship between the adjacent pixel groups RG, PG1, PG2, PG3 and TG included in the kernel UK, in step S30. For example, the image processor 200 may calculate first to fourth weights W1, W2, W3 and W4 corresponding to texture characteristics of the kernel UK, based on first to fourth target pixel values g41, g42, g43 and g44 of the target pixel group TG, first to fourth reference pixel values g01, g02, g03 and g04 of the reference pixel group RG, first to fourth peripheral pixel values g11, g12, g13 and g14 of the first peripheral pixel group PG1, first to fourth peripheral pixel values g21, g22, g23 and g24 of the second peripheral pixel group PG2 and first to fourth peripheral pixel values g31, g32, g33 and g34 of the third peripheral pixel group PG3. The first weight W1 may indicate the association relationship between the reference pixel group RG and the first peripheral pixel group PG1, the second weight W2 may indicate the association relationship between the reference pixel group RG and the second peripheral pixel group PG2, the third weight W3 may indicate the association relationship between the reference pixel group RG and the third peripheral pixel group PG3, and the fourth weight W4 may indicate the association relationship between the reference pixel group RG and the target pixel group TG.

The image processor 200 may generate a first target sum value G4' of the target pixel group TG based on the first to fourth weights W1, W2, W3 and W4 and the first to fourth target pixel values g41, g42, g43 and g44, in step S40. In the present embodiment, the image processor 200 may generate the first to fourth weights W1, W2, W3 and W4 based on the reference pixel group RG, and apply the first to fourth weights W1, W2, W3 and W4 to the target pixel group TG. This is based upon the texture characteristics of the kernel UK being kept the same, i.e., constant, in the target pixel group TG included in the kernel UK.

On the other hand, when the analysis result of the image texture indicates that the kernel UK is the flat region (that is, "NO" in step S20), the image processor 200 may generate a second target sum value G4 of the target pixel group TG based on the first to fourth target pixel values g41, g42, g43 and g44, in step S50.

The image processor 200 may generate a sum image 4SUM_IMG based on any one of the first and second target sum values G4' and G4 according to the texture characteristics of the kernel UK, in step S60.

Figure 7:
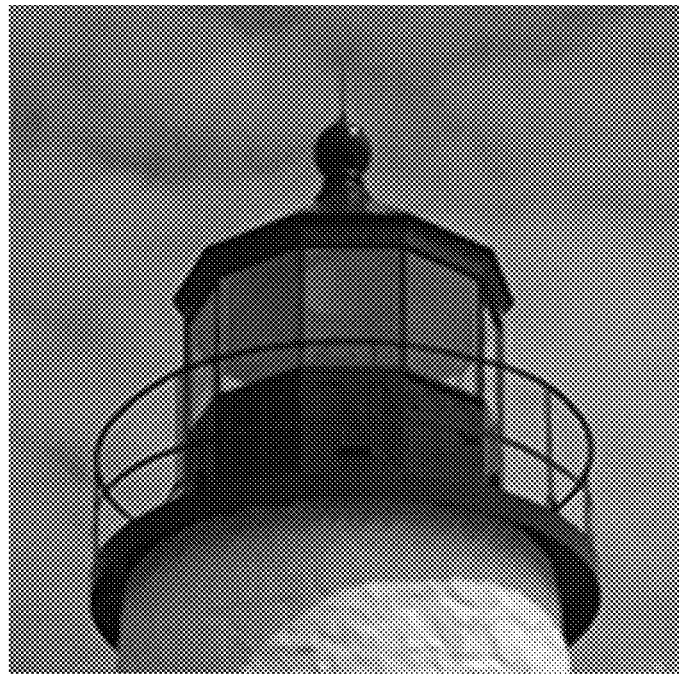
FIG. 7 is a diagram illustrating a sum image in accordance with an embodiment of the present disclosure.

FIG. 7 is a diagram illustrating a sum image in a 4-sum mode in accordance with an embodiment of the present disclosure.

Referring to FIG. 7, the resolution performance of the sum image according to the present embodiment does not deteriorate even in the 4-sum mode as texture characteristics of a kernel UK are applied to a target pixel group. Particularly, it may be seen that an edge region of the sum image according to the present embodiment has an improved detail.

In accordance with the embodiment of the present disclosure, the loss of the resolution performance may be prevented in the 4-sum mode as the texture characteristics of the kernel are applied to the target pixel group.

In accordance with the embodiment of the present disclosure, the loss of resolution performance that is, resolving power, may be prevented in a low light level mode or a preview mode, thereby improving the quality of an image.

In addition, as a simplified operation is performed in the embodiment of the present disclosure, as compared to conventional art such as edge directed interpolation, it is easy for the image sensing device to perform a high speed operation with low power.

While the present disclosure has been illustrated and described with respect to a specific embodiment, the disclosed embodiment is provided for description, and not intended to be restrictive. Further, it is noted that the present disclosure may be achieved in various ways through substitution, change, and modification that fall within the scope of the following claims, as those skilled in the art will recognize in light of the present disclosure.

What is claimed is:

1. An image sensing device comprising:
   an analysis module suitable for analyzing, based on pixel values of a kernel, an image texture of the kernel including a target pixel group and one or more adjacent pixel groups;
   a sum module suitable for generating any one of a first target sum value and a second target sum value based on an analysis result of the analysis module, wherein first target sum value is obtained by applying texture characteristics of the kernel in target pixel values of the target pixel group and the second target sum value is obtained without applying the texture characteristics of the kernel in the target pixel values; and
   a processing module suitable for generating a sum image based on any one of the first and second target sum values.

2. The image sensing device of claim 1, wherein the image texture includes information indicating whether the kernel is an edge region or a flat region.

3. The image sensing device of claim 1, wherein the analysis module includes:
   a first calculation unit suitable for generating a characteristic value indicating a dynamic range of the kernel based on the pixel values of the kernel; and
   an analysis unit suitable for analyzing the image texture of the kernel based on the characteristic value and a reference value.

4. The image sensing device of claim 3, wherein the first calculation unit calculates the characteristic value by subtracting a minimum value from a maximum value among the pixel values of the kernel.

5. The image sensing device of claim 3, wherein the analysis unit compares the characteristic value with the reference value and analyzes whether the image texture of the kernel is an edge region or a flat region according to a comparison result.

6. The image sensing device of claim 1, wherein the sum module includes:
- a second calculation unit suitable for generating one or more weights corresponding to the texture characteristics of the kernel based on the target pixel values of the target pixel group and adjacent pixel values of the adjacent pixel groups when the analysis result of the analysis module indicates that the image texture of the kernel is an edge region;
- a first sum unit suitable for generating the first target sum value based on the weights and the target pixel values; and
- a second sum unit suitable for generating the second target sum value based on the target pixel values when the analysis result of the analysis module indicates that the image texture of the kernel is a flat region.

7. The image sensing device of claim 1, wherein the sum module calculates, as the texture characteristics of the kernel, weights of a reference pixel group of the adjacent pixel groups based on the pixel values of the kernel.

8. The image sensing device of claim 1, wherein each of the target pixel group and adjacent pixel groups includes a plurality of pixels, and the plurality of pixels have the same color.

9. The image sensing device of claim 8, wherein the same color includes a green color.

10. An image sensing device comprising:
- an image sensor including a pixel array having a quad pattern, and suitable for sensing pixel values generated from the pixel array; and
- an image processor suitable for calculating first to fourth weights corresponding to texture characteristics for each kernel based on the pixel values for each kernel, and generating a first target sum value for each kernel by applying the first to fourth weights respectively in first to fourth target pixel values for each kernel.

11. The image sensing device of claim 10, wherein the image processor analyzes an image texture for each kernel, and generates the first target sum value for each kernel based on an analysis result, or generates a second target sum value for each kernel without applying the first to fourth weights in the first to fourth target pixel values.

12. The image sensing device of claim 11, wherein the image texture includes information indicating whether the kernel is an edge region or a flat region.

13. The image sensing device of claim 10,
wherein each kernel within the pixel array includes a target pixel group, a reference pixel group and first to third peripheral pixel groups,
wherein each of the target pixel group, reference pixel group and first to third peripheral pixel groups includes first to fourth pixels, and
wherein the first to fourth pixels have the same color.

14. The image sensing device of claim 13, wherein the same color includes a green color.

15. An operating method of an image sensing device, comprising:
- entering a set mode;
- analyzing, based on pixel values of a kernel, an image texture of the kernel including a target pixel group, a reference pixel group and first to third peripheral pixel groups;
- calculating, when an analysis result of the image texture indicates that the kernel is an edge region, first to fourth weights based on target pixel values of the target pixel group, reference pixel values of the reference pixel group, first peripheral pixel values of the first peripheral pixel group, second peripheral pixel values of the second peripheral pixel group and third peripheral pixel values of the third peripheral pixel group; and
- generating a first target sum value of the target pixel group based on the first to fourth weights and the target pixel values.

16. The operating method of claim 15, wherein the set mode includes a low light level mode or a preview mode.

17. The operating method of claim 15, further comprising:
- generating a second target sum value of the target pixel group based on the target pixel values when the analysis result of the image texture indicates that the kernel is a flat region; and
- generating a sum image based on any one of the first target sum value and the second target sum value.

18. The operating method of claim 15, wherein the calculating of the first to fourth weights includes:
- calculating the first weight based on a ratio of a value obtained by summing up the first peripheral pixel values and a value obtained by summing up the reference pixel values;
- calculating the second weight based on a ratio of a value obtained by summing up the second peripheral pixel values and a value obtained by summing up the reference pixel values;
- calculating the third weight based on a ratio of a value obtained by summing up the third peripheral pixel values and a value obtained by summing up the reference pixel values; and
- calculating the fourth weight based on a ratio of a value obtained by summing up the target pixel values and a value obtained by summing up the reference pixel values.

* * * * *